READ-ONLY DIGITAL DATA STORAGE ARRANGEMENT
Filed Feb. 25, 1966
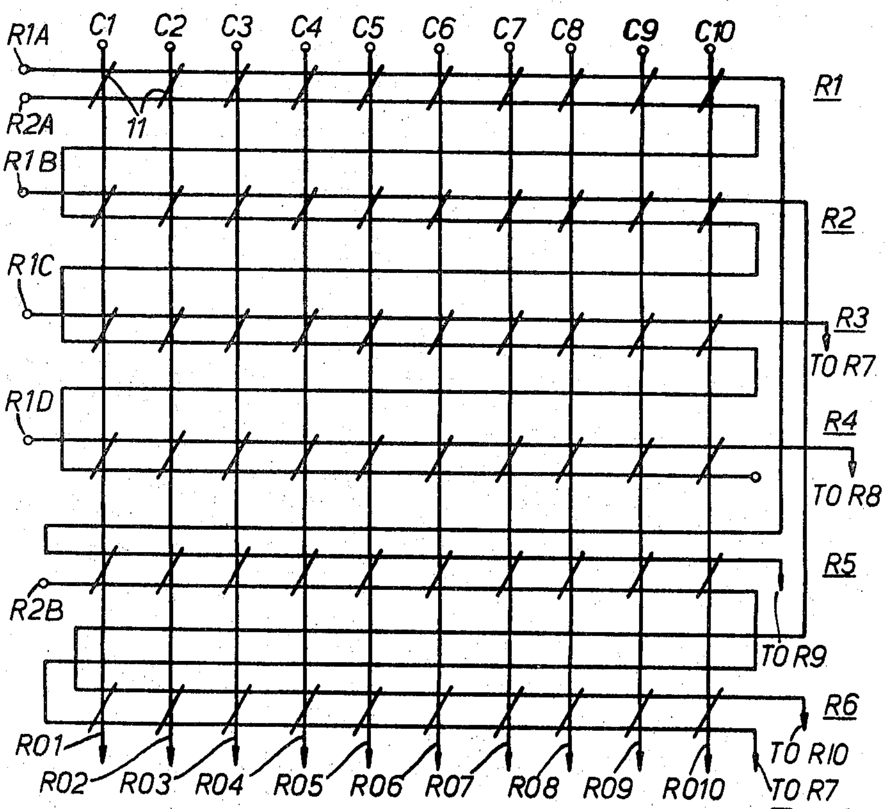
FIG. 1.
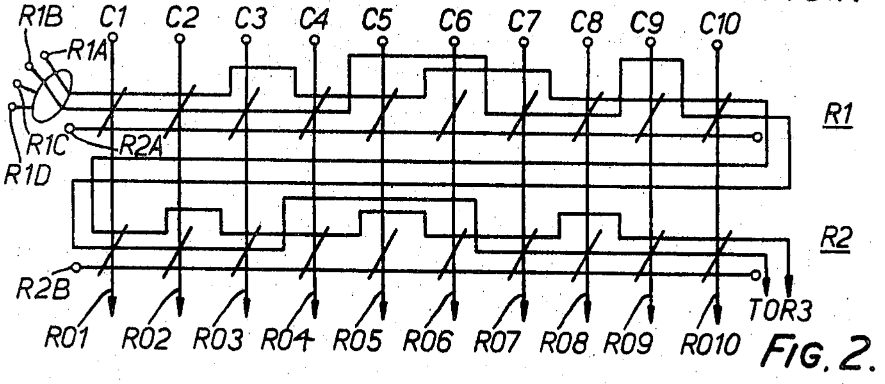
FIG. 3.
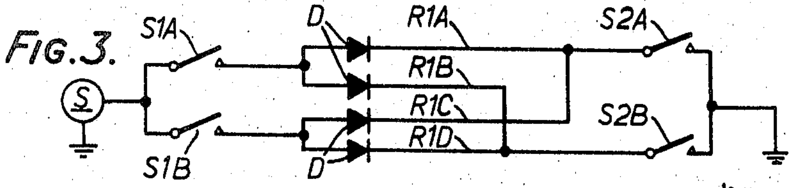
INVENTOR
BRIAN ALFRED BOULTER
BARRY DWYER
BY
[signature]
ATTORNEY United States Patent Office 3,469,247
Patented Sept. 23, 1969

3,469,247
READ-ONLY DIGITAL DATA STORAGE ARRANGEMENT

Brian Alfred Boulter and Barry Dwyer, London, England, assignors to Elliott Brothers (London) Limited, London, England, a British company
Filed Feb. 25, 1966, Ser. No. 530,060
Claims priority, application Great Britain, Mar. 9, 1965, 9,849/65
Int. Cl. G11b 5/02
U.S. Cl. 340—174 6 Claims

ABSTRACT OF THE DISCLOSURE

A read-only data storage arrangement comprises a matrix of row and column electrical conductors, with magnetic cores operatively arranged at at least some of the matrix intersections, the stored data being represented by the number and position of the operative cores in each row. Each row has two row conductors which are so linked with the cores of that row as to tend to switch the cores in opposite directions when energised. Thus, successive energisation of the two row conductors of any row produces output signals on the column conductors representing the data stored in that row.

This invention relates to data storage arrangements.

According to one aspect of the invention there is provided a data storage arrangement, comprising a plurality of bistable storage elements having a first stable state and a second stable state, a plurality of read-input means each associated with a respective read-input combination of the bistable storage elements, each read-input combination being different but including some of the bistable storage elements in at least one other said read-input combination, each of a first type of the said read-input means being operative on receipt of an input signal to switch the bistable storage elements in the associated read-input combination from the first stable state to the second stable state and each of a second type of the read-input means being operative on receipt of an input signal to switch the bistable storage elements in the associated read-input combination from the said second to the said first stable state, and a plurality of read-output means each associated with a respective read-output combination of the bistable storage elements, each read-output combination including at least one bistable storage element in each said read-input combination, whereby each read-output means produces an output signal representing data stored in a particular bistable storage element when input signals are applied alternately to read-input means of the first type and read-input means of the second type which are associated with such ones of the said read-input combination as each include the said particular bistable storage element. According to another aspect of the invention there is provided a read-only data storage arrangement, comprising a plurality of bistable storage elements, first read-input means associated with a first combination of the said bistable storage elements so as to tend to change the bistable elements in the first combination from a first to a second stable state in response to the application of an input signal to the first read-input means, second read-input means associated with a second combination of the said bistable storage elements so as to tend to change the bistable elements in the second combination from the said second to the said first stable state in response to the application of an input signal to the said second read-input means, the second combination of the bistable storage elements including at least one but not all of the storage elements in the said first combination, and read-output means associated with at least one storage element included in both the first and second combinations for producing an output, representing data stored, in response to two successive inputs applied respectively to the first and second read-input means.

The term "read-only data storage arrangement" is intended to include any data storage arrangement in which data is permanently or semi-permanently stored and is not changed by the process of reading out data, but can be changed by, for example, changes in wiring, effective removal or replacement of storage elements, rendering different ones of the storage elements ineffective.

Two magnetic core read-only data storage arrangements embodying the invention will now be described by way of example and with reference to the accompanying drawings in which:

FIGURE 1 shows part of one of the storage arrangements in diagrammatic form;

FIGURE 2 shows part of the other storage arrangement in diagrammatic form; and

FIGURE 3 shows a schematic circuit diagram of a switching arrangement for use with the arrangements of FIGURES 1 and 2.

Referring firstly to FIGURE 1 there is shown a storage device comprising a plurality of magnetic core storage elements 11 arranged in rows, of which some only (referenced R1 and R6) are shown, and ten columns C1 to C10. Each of the storage elements 11 comprises a core of magnetic material having rectangular loop hysteresis characteristics such that it can be biased to either one of two stable states so as to store a binary "0" or "1."

The rows of storage elements are threaded with a plurality of first read-input conductors R1A, R1B, R1C and R1D and a plurality of second read-input conductors R2A, and R2B. The first read-input conductors are arranged to pass through all the storage elements of every fourth row. Hence conductor R1A passes through all the storage elements in row R1, and all the storage elements in row R5; conductor R1B passes through all the storage elements in row R2, and all the storage elements in row R6; and so on for conductors R1C and R1D. Each first read-input conductor passes through its associated storage elements in such manner that, when an input is applied to the conductor, the associated storage elements are all caused to assume a particular one of their stable states; it will be assumed that they are caused to store a binary "1." The second read-input conductors R2A and R2B are arranged such that the conductor R2A passes through all the storage elements of the rows R1, R2, R3 and R4 and the conductor R2B passes through all the storage elements of the next four rows (only rows R5 and R6 being shown). Each of these second read-input conductors R2A and R2B pass through the storage elements in such manner that, when an input is applied to the conductor, the associated storage elements are all caused to assume the other of their bistable states, that is, so as to store a binary "0."

Each of the columns C1 to C10 of the storage elements 11 has associated therewith a respective read-output conductor RO1–RO10.

In this arrangement, a binary word is stored in each of the rows of the matrix by providing an external magnetic field which is selectively applied to selected ones of the storage elements 11 so as to render them ineffective. The same effect can of course be achieved by failing to provide storage elements in all of the positions shown. With the arrangement shown, however, the binary words stored in the different rows can be changed simply by applying the external magnetic field to different elements.

In operation, all the storage elements 11 are initially caused to assume a stable state representative of a binary "0." This can be achieved by a further conductor (not shown) threading all the storage elements 11 or by applying an input to both second read-input conductors R2A and R2B. Assuming it is required to read out the binary word stored in row R5, an input is applied to first read-input conductor R1A, so causing all the storage elements in rows R1 and R5 to assume a stable state representative of a binary "1"; an input is then applied to second read-input conductor R2B so causing all the elements in row R5 which are now in a binary "1" state to revert to the binary "0" state, only those elements which are not affected by the external magnetic field having their stable states changed. Hence an output is provided on each of the read output conductors RO1–RO10 which pass through those storage elements in row R5 which are not affected by the external magnetic field. Therefore, a word can be selected from any one of a number of rows by the application of two separate inputs.

Referring now to FIGURE 2, there is shown a storage device similar to that of FIGURE 1 but in this instance the first read-input conductors R1A and R1B pass through selected ones only of the storage elements 11 in each of the rows; each of the second read-input conductors R2A and R2B passes through all the storage elements of a respective row. In this case a different binary word is stored in each of the rows for each of the first read-input conductors, the word depending on the manner in which the conductor is threaded through the storage elements. Again, any required binary word can be read out from the store by applying an input to the appropriate first read-input conductor and then applying an input to the appropriate second read input conductor. This storage device has the advantage over the one shown in FIGURE 1 that a number of binary words can be stored for each row of storage elements but has the disadvantage that the words stored are not easily changed as the words stored are determined by the manner in which the conductors thread the elements.

Referring now to FIGURE 3, there is shown a circuit diagram of a simple switching arrangement for selecting to which of the first read input leads R1A to R10 an input is to be applied. The arrangement comprises a pair of selection switches S1A and S1B having one side commonly connected via a signal source S to earth and a further pair of selection switches S2A and S2B, each of which has one side thereof commonly connected to earth. The other side of switch S1A is connected, via read input conductors R1A and R1B respectively, to the other side of switches S2A and S2B; the other side of switch S1B is connected, via read input conductors R1C and R1D respectively, to the other side of switches S2A and S2B. Each of the read input conductors has connected in series therewith a diode D which serves to prevent current flowing in any one conductor from flowing in the other conductors.

When it is desired to apply an input to read-input conductor R1A, for example, switches S1A and S2A are closed and switches S1B and S2B are maintained open. Thus a circuit is completed from earth via the supply source, switch S1A, diode D, conductor R1A, switch S2A, to earth. The switches S1B and S2B, being open, prevent the direct passage of current through the conductors R1B, R1C and R1D, and the diodes D prevent spurious circulatory currents from flowing in these conductors.

A similar switching arrangement can be provided for the second read-output conductors.

It will be seen that a similar switching arrangement can be constructed for controlling the energisation of more than the four conductors shown in FIG. 3. If, for example, there are nine conductors whose energisation is to be controlled, then six switches are required. The conductors are arranged in three groups of three. The conductors in each group are connected together at one end and arranged to be connected in common to the supply through a respective one of three of the switches. The other ends of the first conductors in all the groups are connected together and arranged to be connected in common to the earth terminal through the fourth switch. Similarly, the other ends of the second conductors in all the groups are connected together and arranged to be connected to the earth terminal by the fifth switch, and the other ends of the third conductors in all the groups are connected together and arranged to be connected to the earth terminal through the sixth switch. As in FIG. 3 a diode is provided in series with each conductor to prevent circulating current. In general, the number of switches required is equal to at least twice the square root of the number of conductors whose electrical energisation is to be controlled.

For ease of drawing and description, storage devices having merely a small number of storage elements have been described but it should be appreciated that in practice a much larger number of storage elements would be employed for utilising the advantages of the invention to the full.

In the embodiments described, there have been shown a plurality of first read-input conductors R1A, R1B, R1C and R1D, and a plurality of second read-input conductors R2A and R2B. Additional pluralities of read-input conductors may, however, be employed. For example, there may be a plurality of third read-input conductors and a plurality of fourth read-input conductors in addition to the pluralities of first and second read-input conductors illustrated. The addition of a relatively small number of read-input conductors in this way enables the reading out of data from a very much larger storage arrangement to be easily controlled. For example, a storage arrangement could be constructed having a plurality of matrices each of which is identical with that described in relation to FIG. 1 or 2. The first read-input conductors R1A of all the matrices would be connected in series; similarly, the first read-input conductors R1B of all the matrices would be connected in series, and so on for the first read-input conductors R1C and R1D. In addition, the second read-input conductors R2A of all the matrices would be connected in series and so would the second read-input conductors R2B of all the matrices. Corresponding read-output conductors of all the matrices would be connected in series; that is, all the read-output conductors RO1 would be connected in series, all the read-output conductors RO2 would be connected in series, and so on for the remaining read-output conductors. Each matrix would then be provided with a separate third read-input conductor arranged to pass through all the storage elements in all the rows of that matrix. Therefore, a word can be selected from any one of the rows in all the matrices merely by the application of three separate inputs applied in succession to the appropriate first read-input conductor, the appropriate second read-input conductor, and the appropriate third read-input conductor. The storage arrangement can be further increased in size if further read-input conductors, for example fourth, fifth, sixth, etc., read-input conductors are provided. It will be appreciated, however, that practical considerations such as the number of conductors which can be physically passed through the storage elements, must be borne in mind and will provide a limit to the number of read-input conductors which can be used.

The storage devices disclosed are particularly suited for use in so-called "head-up displays" which are employed in aircraft, but it will be appreciated that they could equally well be used for other purposes, for example, computers or telephone exchange equipment.

The storage devices shown in the embodiments illustrated have the advantage that the number of circuits required to drive the cores, in order to read out data, is reduced due to the "AND" type of selection; in addition, the devices are less affected by ambient temperature fluctuations due to the use of full current selection.

The magnetic cores may be replaced by other storage elements; for example, they be replaced by other bistable electrical devices each of which is switchable between its two stable states in response to electrical energisation of an electrical conductor arranged to influence the device and capable of electrically energising an electrical conductor arranged to be influenced by the device when so switched.

What is claimed is:

1. A read-only data storage arrangement, comprising a plurality of bistable electrical devices each switchable between a first and a second stable state and operationally arranged in matrix having a plurality of columns and a plurality of rows, a plurality of first electrical conductors each electrically coupled with all the bistable electrical devices in a respective first pair of said rows, means selectively operable to electrically energise a selected one of the first electrical conductors whereby to tend to switch the bistable electrical devices in the said respective first pair of rows from the first to the second stable state, a plurality of second electrical conductors each electrically coupled with all the bistable electrical devices in a respective second pair of said rows, one row only of which is one of the rows of a respective one of the said first pairs of rows, means selectively operable to electrically energise the one of the second conductors which is electrically coupled with the particular row with which the selected first conductor is coupled whereby to tend to switch the bistable electrical devices in the corresponding second pair of rows from the said second to the said first stable state, magnetic field producing means positioned to produce magnetic fields interacting with a particular combination of the said bistable electrical devices in each said row so as to prevent the particular combination of devices being switched between their two stable states, whereby the said particular combination determines the data stored in the said row, and a plurality of third electrical conductors each electrically coupled with all the bistable electrical devices in a respective said coumn whereby to produce output signals representing the data stored in the said particular row when the first and second means are successively operative.

2. A storage arrangement according to claim 1, in which each bistable electrical device comprises a magnetic core having a substantially rectangular hysteresis loop and switchable between two stable states of magnetisation.

3. A read-only data storage arrangement, comprising a plurality of cores of magnetic material having a substantially rectangular hysteresis loop, each core being switchable between a first and a second stable state of magnetisation, all the said cores being operationally arranged in a matrix having a plurality of columns and a plurality of rows, a plurality of first electrical conductors each electromagnetically linking with all the cores in a respective pair of said rows which are separated by at least one other said row, each row having only one first electrical conductors, first control means selectively operable to electrically energise a particular one of the said first electrical conductors whereby electrical energisation of the said particular first electrical conductor tends to switch the cores in the respective pair of said rows from the said first to the said second state, a plurality of second electrical conductors each electromagnetically linking with all the cores in a respective plurality of consecutive said rows which plurality includes one only of the pair of rows corresponding with any one first conductor, second control means selectively operable to electrically energise the particular one of the said second electrical conductors which links with one of the rows corresponding with the said particular first conductor, whereby electrical energisation of the said particular second electrical conductor tends to switch the cores in the said respective plurality of consecutive rows from the said second to the said first stable state, and a plurality of third electrical conductors each electromagnetically linking with all the cores in a respective said column, whereby each said third electrical conductor is electrically energised in response to the switching of a said core in the respective said column to produce an output signal representing the data stored in the row common to the said particular first and second conductors.

4. A storage arrangement according to claim 3, in which each of the said first and the said second control means comprises a plurality of electrical switches equal in number to at least twice the square root of the number of said conductors to be electrically energised, a power supply source, means connecting each said conductor in series with the power supply source through a respective pair of the said electrical switches whereby the said conductor is connected for electrical energisation when both of the said pair of electrical switches are closed, and a unidirectional conducting device connected in series with each said conductor, and between the respective said pair of electrical switches, to prevent more than one said conductor being connected for electrical energisation when both of a said pair of electrical switches are closed.

5. A read-only storage arrangement, comprising a plurality of electrical conductors arranged in a matrix of rows and columns and including a plurality of row conductors of a first type, a plurality of row conductors of a second type, and a plurality of column conductors, each one of the row conductors of the first type passing along a respective first plurality of rows and each one of the row conductors of the second type passing along a respective second plurality of rows, each second plurality of rows including not more than one row of any said first plurality of rows and each row having one only of the first type of row conductor and one only of the second type of row conductor, a plurality of magnetic cores each having first and second stable states of remanent magnetism, each core being operatively positioned at the intersection of a respective row of the matrix and a respective column so as to electromagnetically link with the respective first and second type row conductors of that row and with the respective column conductor of that row, first control means selectively operable to electrically energise a particular one of the first type of row conductor so as to tend to switch the cores linking with that conductor from the first to the second stable state, and second control means selectively operable to electrically energise a particular one of the second type of electrical conductor so as to tend to switch the cores linking with that conductor from the second to the first stable state, whereby stored data represented by the number and position of cores in the row of the matrix along which passes both the said particular first type of row conductor and the said particular second type of row conductor is read out in the form of output signals on the column conductors when the first and second control means are successively operated, following an initial condition in which all the cores are in the first stable state.

6. A data storage arrangement according to claim 5, in which each row conductor of the first type passes along each *n*th row, where *n* is at least two, and each row conductor of the second type passes along all the rows of a respective group of *n* consecutive rows.

References Cited

UNITED STATES PATENTS

| | | | |
|---|---|---|---|
| 3,015,813 | 1/1962 | Tyrlick | 340—347 |
| 3,121,862 | 2/1964 | Ridenour et al. | 340—166 X |
| 3,123,816 | 3/1964 | Schramel et al. | 340—347 |
| 3,263,221 | 7/1966 | Van Der Hoek | 340—174 |

BERNARD KONICK, Primary Examiner

J. F. BREIMAYER, Assistant Examiner

U.S. Cl. X.R.

340—166, 173